June 17, 1930.  H. B. BARKER  1,763,741
DISPLAY DEVICE
Filed Jan. 19, 1928  4 Sheets-Sheet 1
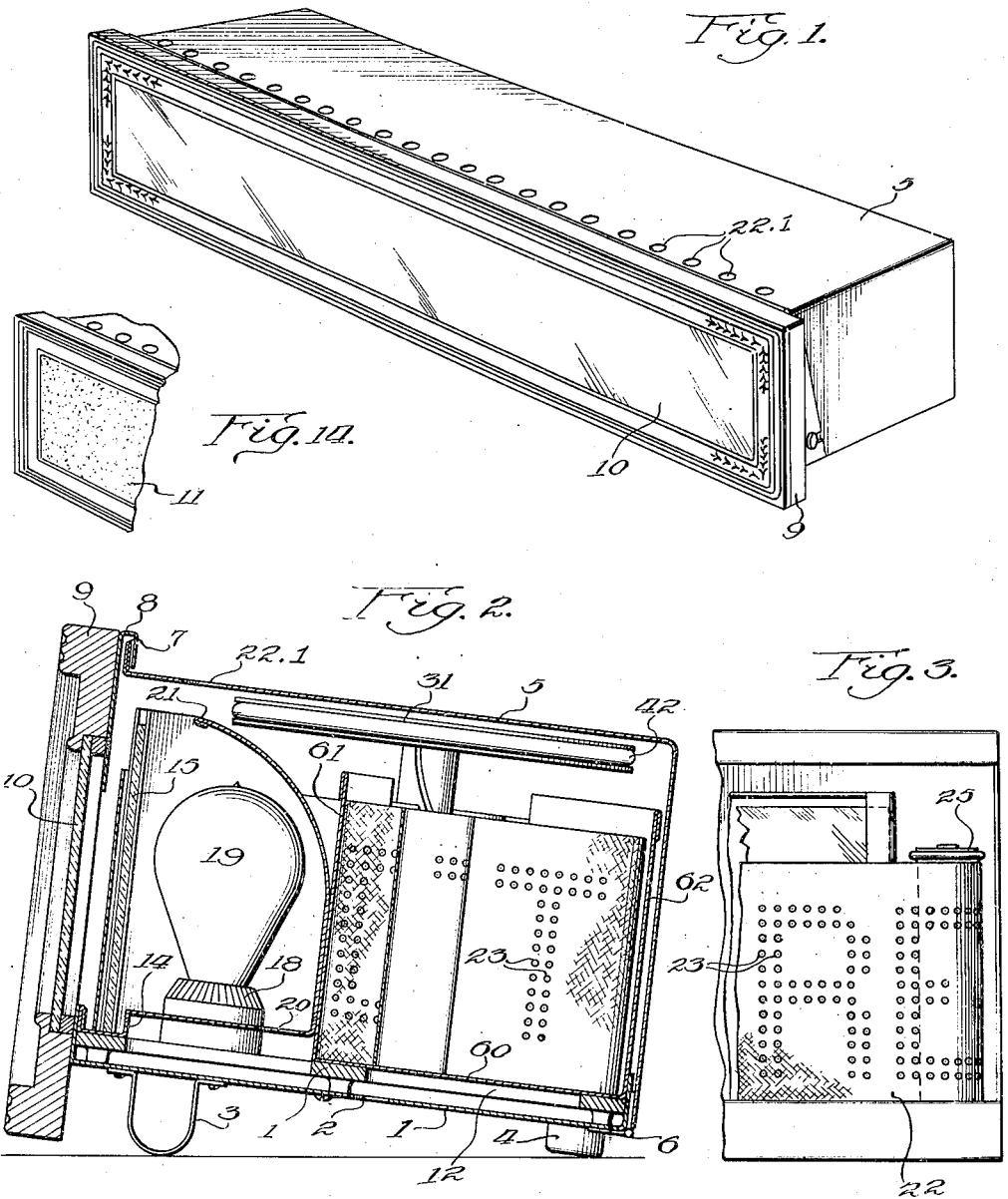
Inventor
Harry B. Barker.

June 17, 1930.　　H. B. BARKER　　1,763,741
DISPLAY DEVICE
Filed Jan. 19, 1928　　4 Sheets-Sheet 2
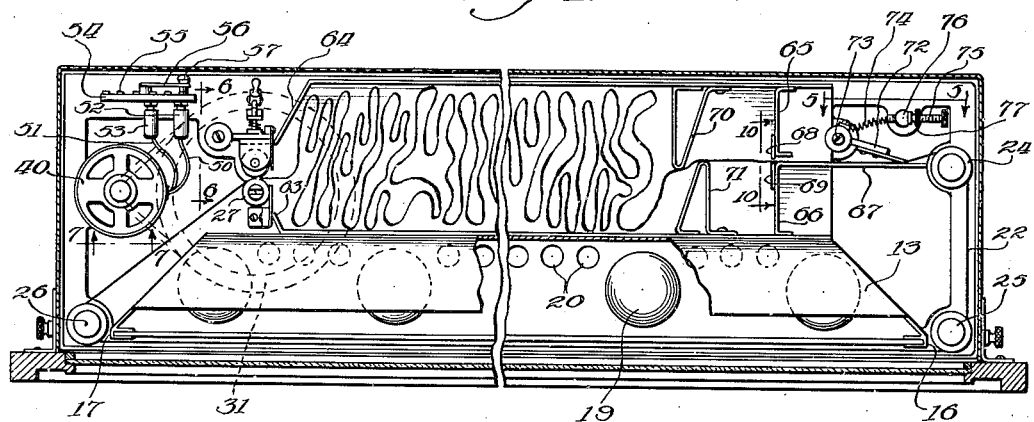
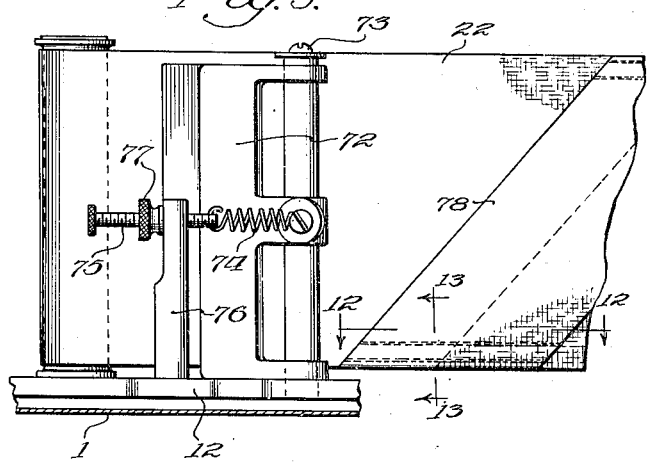
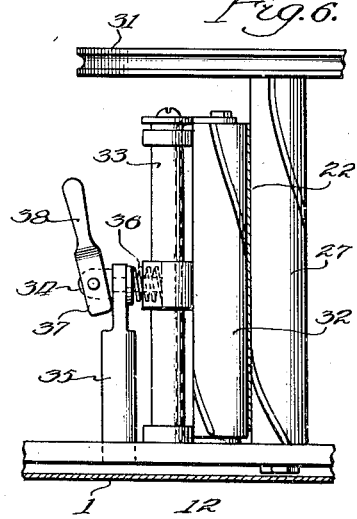
Inventor.
Harry B. Barker.

June 17, 1930.	H. B. BARKER	1,763,741
DISPLAY DEVICE
Filed Jan. 19, 1928	4 Sheets-Sheet 3
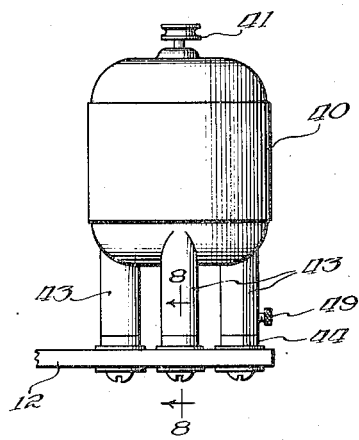
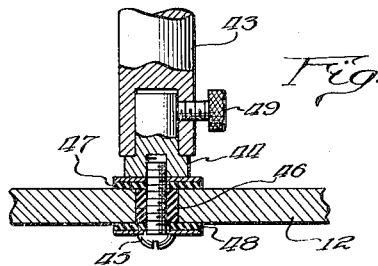
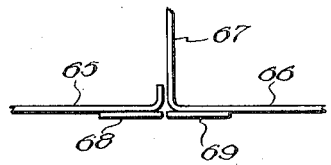
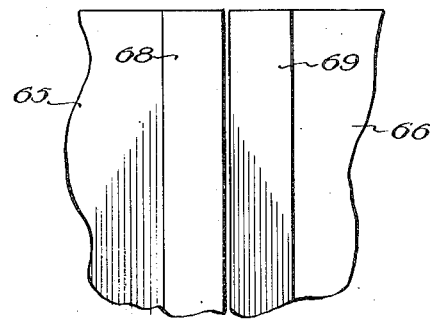
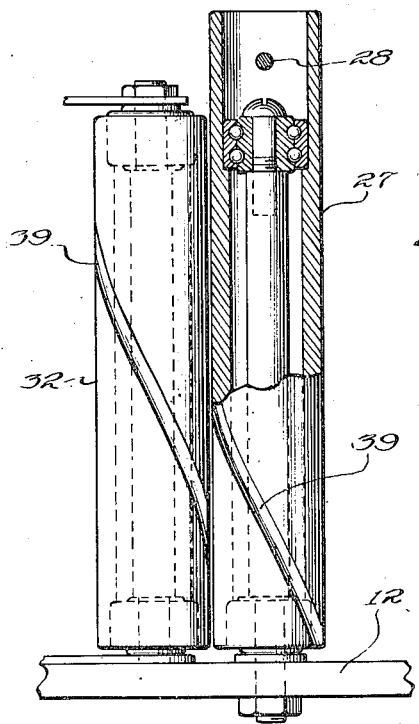
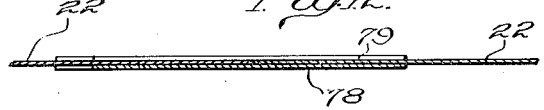
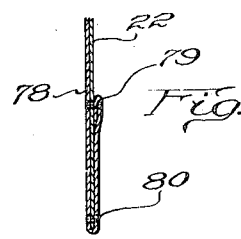
Inventor
Harry B. Barker.
Rummler & Rummler,
Attys.

June 17, 1930.  H. B. BARKER  1,763,741
DISPLAY DEVICE
Filed Jan. 19, 1928   4 Sheets-Sheet 4
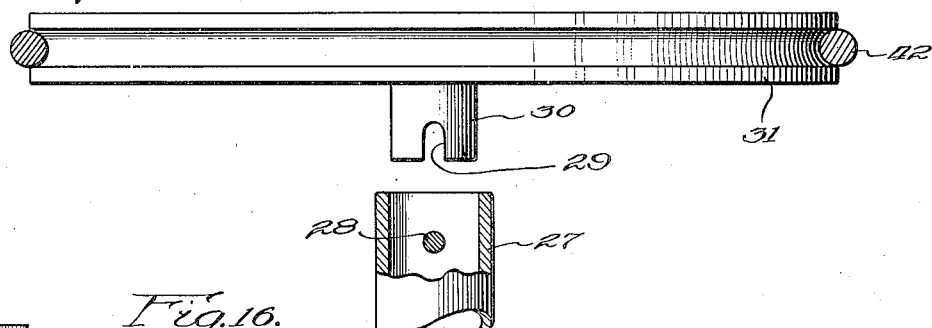
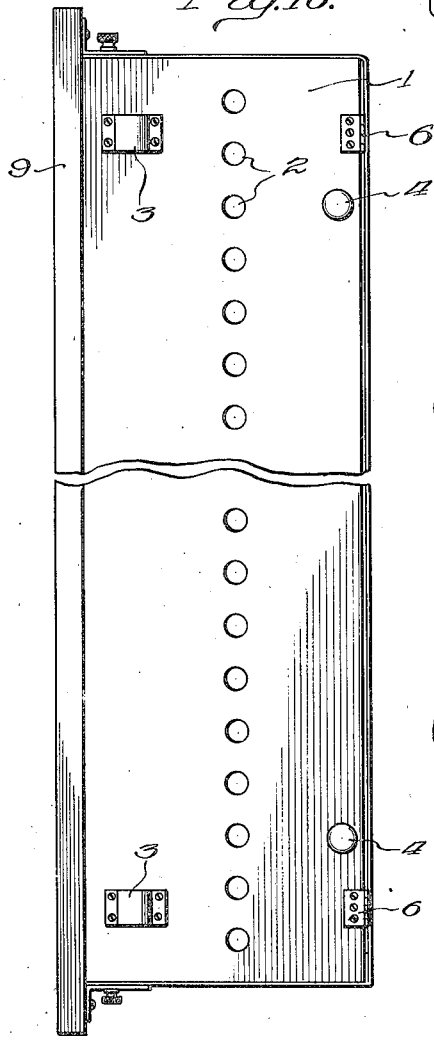
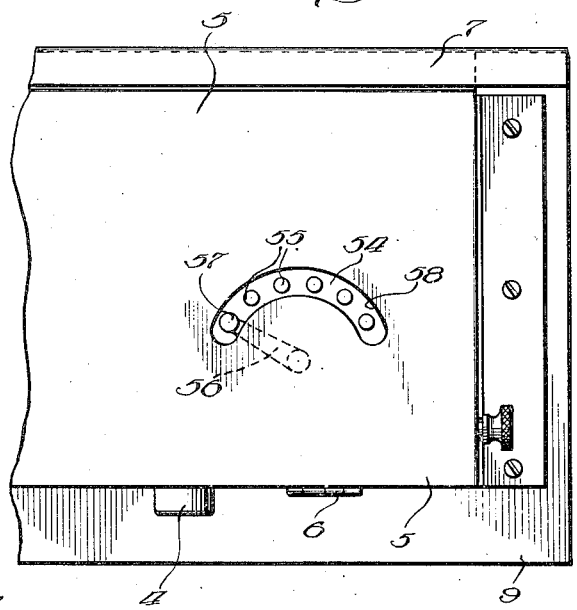
Witnesses
Arthur M. Framke.
Wm. F. Hann
Inventor
Harry B. Barker.
Rummler & Rummler
Attys.

Patented June 17, 1930

1,763,741

UNITED STATES PATENT OFFICE

HARRY B. BARKER, OF CHICAGO, ILLINOIS, ASSIGNOR, BY MESNE ASSIGNMENTS, TO CHARLES W. RAYNOR, OF NEW YORK, N. Y.

DISPLAY DEVICE

Application filed January 19, 1928. Serial No. 247,917.

This invention relates to advertising signs of the traveling letter or word type of the same general character as that shown in my co-pending application, Serial No. 180,138, filed April 1, 1927.

The main objects of this invention are to provide an improved form of advertising device in which the traveling endless belt is more steadily passed between the source of light and the onlookers; to provide improved tensioning means for holding the endless belt taut during its passage before the source of light; to provide improved driving rollers which have greater frictional tension for driving the belt; to provide improved means for straightening out the folds of the belt prior to its withdrawal from the magazine; to provide an improved form of opening at the discharge end of the magazine through which the traveling belt passes; to provide an improved method of splicing the ends of the belt together; to provide improved means for forming the indicia on the traveling belt; and to provide a traveling word sign of this type wherein the reading matter or other indicia on the traveling belt is clearly visible and readable from widely divergent angles without blurring or distortion and to provide a clearly visible attractive sign without the use of a diffracting screen as heretofore used.

An illustrative embodiment of this invention is shown in the accompanying drawings in which:

Figure 1 is a view in perspective of the complete device.

Figure 2 is an enlarged sectional view of the device taken on the line 2—2 of Fig. 4.

Figure 3 is an enlarged fragmentary detail showing one end of the device from front elevation with the traveling belt in position thereon.

Figure 4 is a horizontal section of the complete device with portions thereof broken away to more clearly show the construction.

Figure 5 is an enlarged fragmentary detail taken on the line 5—5 of Fig. 4.

Figure 6 is an enlarged fragmentary detail taken on the line 6—6 of Fig. 4.

Figure 7 is an enlarged fragmentary detail taken on the line 7—7 of Fig. 4.

Figure 8 is an enlarged fragmentary detail taken on the line 8—8 of Fig. 7.

Figure 9 is a top plan view of the construction shown in Fig. 10.

Figure 10 is an enlarged fragmentary detail taken on the line 10—10 of Fig. 4.

Figure 11 is an enlarged detail of a portion of the construction shown in Fig. 6, a part thereof being shown in vertical section to show the interior construction.

Figure 12 is an enlarged section of the traveling belt taken on the line 12—12 of Fig. 5.

Figure 13 is an enlarged sectional detail of the same taken on the line 13—13 of Fig. 5.

Figure 14 is a fragmentary view in perspective of a modified form of front window for the improved device showing the sand blasted glass in place of a clear transparent glass.

Figure 15 is an enlarged fragmentary view showing the removable drive pulley wheel and top end of the belt drive roller in which the hub of the pulley wheel fits.

Figure 16 is a bottom plan view of the device showing the ventilating holes in the base and supporting feet for the device.

Figure 17 is an enlarged fragmentary elevation of one end of the back of the device showing the rheostat control and arc shaped opening in the case through which the operator reaches to regulate the speed of the electric drive motor.

In the construction shown in the drawings, the exterior housing and front window frame is of the same general character as that shown in my heretofore mentioned co-pending application and comprises a sheet metal base 1 having a row of ventilating holes 2 extending along the medial part thereof. The base 1 is supported in an inclined position on U-shaped brackets 3 located along the front edge thereof and relatively shorter rubber feet 4 located along the rear edge thereof. A cover member 5, preferably of sheet metal, is hinged at 6 along the rear edge of the base 1. The cover member 5 forms back, top, and end walls which, taken with the base 1, form an elongated rectangular shaped box-like housing open at the front side.

The front marginal edge of the cover 5 has an upwardly extending flange 7 formed thereon over which loosely hooks an inverted U-shaped flange 8 which is secured to a rectangular wooden framework 9. The frame 9 carries a glass 10 which may be of plain transparent nature or a glass 11 having its surface slightly sand blasted as shown in the modification illustrated in Fig. 14.

A frame 12, preferably an aluminum spider casting, is mounted on the base 1 in spaced relation thereto for supporting the operating mechanism and other interior elements of the sign.

A combined guide, lamp receptacle support, and reflector member 13 is mounted on the frame 12 along the front marginal edge thereof. The lower front portion of member 13 is shaped to form an upwardly facing channel guide 14 for receiving the lower marginal edge of a vertically disposed diffusing screen 15 which is slidably mounted in inwardly facing channel guides 16 and 17 on the ends of the member 13. The screen 15 is preferably of opal glass and gives a very even distribution of the light from the incandescent bulbs 19. The horizontally disposed portion of the member 3 is provided with a plurality of holes for receiving a series of standard sign receptacles 18 which support a like number of incandescent light bulbs 19 for furnishing a source of light. Rearward of the receptacle 18 the member 13 is also provided with a plurality of spaced apertures 20 which permit a circulation of air around the light bulbs for cooling purposes.

The member 13, at the rear of the light bulbs is bent upwardly and then forwardly to provide a reflector for the source of light. The upper forwardly extending edge 21, terminates in spaced relation to the top edge of the screen 15 so as to permit the escape of warm air from around the light bulbs and the cover 5 is provided with a plurality of spaced apertures 22.1 located above the opening between the edge 21 and screen 15, but partially to the rear thereof, for permitting the hot air to escape to the atmosphere.

In the devices such as that shown in my heretofore mentioned co-pending application wherein the front window is a diffracting glass, the reading matter or other indicia formed on the traveling belt is not clear and sharp, but is considerably distorted when viewed by a person standing so that their line of vision is at an angle to the plane of the front of the sign. In the present invention, the indicia on the traveling belt sign is sharply defined and easily readable from a much greater distance than heretofore was possible and when viewed from an angle, is not distorted. A pleasing appearance to the reading matter or other indicia on the traveling belt is procured, however, by forming the letters or other indicia by a plurality of substantially parallel rows of perforations in the belt, the size of such perforations being smaller than those heretofore used in this type of traveling belt sign.

As shown in the drawings, an endless traveling belt 22 has letters formed therein by a plurality of substantially parallel rows of perforations 23. The belt 22 is supported edgewise in the device by passing around a series of vertically journaled rollers 24, 25, 26 and 27, mounted on the frame 12. The roller 27 as shown particularly in Figs. 6 and 11 is of greater length than the other rollers and the hollow top end thereof is provided with a transverse pin 28 which is received in a transverse slot 29 formed in the lower end of a hub 30 rigidly mounted on a driven pulley wheel 31.

Means are provided for holding the belt 22 tightly against the drive roller 27 and comprises an idler roller 32 journaled at its upper and lower ends on a yoke 33. The yoke 33 is provided at its medial point with a stud 34 which is slidably mounted in the top end of an upstanding bracket 35. A helical compression spring 36 surrounds the stud 34 and bears between the bracket 35 and the yoke 33 for normally urging the yoke 33 and idler 32 toward the roller 27, so as to snugly grip the belt 22 therebetween. A cam 37 is pivoted to the outer end of stud 34 and is provided with a handle 38 for rotating it on its pivot so as to withdraw the roller 32 from contact with the belt 22 when desired. All of the rollers which support the traveling belt in this construction are preferably made of aluminum or similar metal which has inherent characteristic for adhering to the belt. The outer peripheral surface of each of the rollers, particularly the drive roller 15, is provided with a helical groove 39 formed in the surface thereof which aids in gripping the surface of the belt 22.

Means are provided for driving the pulley wheel 31 and comprise an electric motor 40 mounted on frame 12 with the shaft thereof in a vertical position. The upper end of the armature shaft of said motor protrudes above the motor housing and has a relatively small drive pulley 41 secured thereto which drives a round rubber belt 42 which passes around the grooved peripheral surface of the pulley wheel 31. The hub 30 of the pulley wheel 31 has sliding fit with the interior of the upper end of the roller 27 so as to be readily removable therefrom when it is desired to change or replace the endless belt 22.

The motor 20 is provided with three depending legs 43, the lower ends of which are axially bored to slidably receive the upstanding end of studs 44. Studs 44 are mounted on frame 12 by a screw 45 which passes through a bushing 46, top and bottom washers 47 and 48 respectively, and is threaded into the base of the stud. The bushing and washers are formed of suitable insulating material such as rubber, thus minimizing the communication of vibration from the motor 40 to the base frame 12 at the same time electrically insulating the motor from the base frame and outer housing of the device.

One or more knurled headed set screws 49 are threaded in the legs 43 to detachably secure the motor on the studs 44.

A pair of lead wires 50 and 51 are run to the motor 40 and have connector plugs 52 and 53 on the ends thereof which slidably fit over electric terminals mounted on one face of an upstanding panel member 54 mounted on frame 12. The opposite face of the panel member 54 is provided with a plurality of electrical contacts 55 wired through suitable resistance coils (not shown) so as to provide a rheostat control for regulating the speed of the motor 40. The swingable arm 56 of the rheostat is provided with an insulated knob 57 which protrudes out closely adjacent to back of the housing cover 5 and said housing is provided with an arc shaped slot 58 therein so that a user can reach through and move the control arm 56 without opening the casing of the device. The major portion of the endless belt 22 is housed in a magazine mounted on the frame 12 and located to the rear of the source of light. The magazine comprises a horizontally disposed bottom 60 and vertically extending side walls 61 and 62 formed integrally therewith to provide a relatively narrow elongated open topped receptacle of slightly greater depth than the width of the belt 22. The end of the magazine adjacent the drive roller 27 has the side walls 61 and 62 turned in as shown at 63 and 64 and the opposite end has a pair of members 65 and 66 mounted thereon in slightly spaced relationship to each other so that the belt 22 can pass therebetween. The member 66 has a wall 67 extending from the inner end thereof to a point closely adjacent the roller 24 so that the belt 22 passes closely therealong. The inner faces of the members 65 and 66, at a point closely adjacent the slot through which the belt passes, are provided with square edge straps 68 and 69 respectively, details of which are shown in Figs. 9 and 10. Having a relatively narrow square edge slot for the belt to pass out through, eliminates the tendency of any of the folds of the belt to double up and wedge in said slot as has heretofore sometimes happened.

The magazine shown in the present construction is provided with improved means for straightening out the folds of the belt prior to passing from the magazine and comprises a pair of cooperating inwardly extending vertically disposed members 70 and 71 riveted or otherwise suitably secured to the inner side walls of the magazine as shown particularly in Fig. 4.

Improved means are provided for maintaining a tension on that portion of the belt 22 which passes in front of the source of light and comprises a drag member 72 swingably mounted on a vertical pivot 73. The member 72 is yieldingly urged towards the wall 67 so as to slidably press the belt 22 between said member and wall 67 by a helical tension spring 74 which has one end attached to the member 72 and the other end thereof secured to and adjustable screw 75. The screw 75 is slidably mounted in the upper end of a rigidly disposed upstanding bracket 76 mounted on the frame 12. A knurled nut 77 is threaded on the screw 75 for securing suitable adjustment of the spring 74 to very the tension on the belt 22.

An improved method of securing the ends of the belt 22 together is provided in this construction and consists in cutting the ends of the belt at an angle with respect to the axis thereof, that is, on a bias, the two ends being cut at supplemental angles as shown in Fig. 5 and abutted end to end. A thin strip of material 78 is cemented to one face of the belt edges so as to overlap a portion of each. The ends of the strip 78 are then folded over the side edges of the belt as shown particularly in Fig. 13 and the marginal edge of the strip is turned under and stitched down as shown at 79. A row of stitching 80 is also provided closely adjacent the marginal edge of the belt 22 which passes through both thicknesses of the strip 78 and the belt 22. In this manner a very smooth flexible joint is provided and being on a diagonal with respect to the axis of the belt, does not produce any uneven motion or jerking as the joint in the belt passes over the different supporting rollers or underneath the improved tensioning device 72.

In the operation of this machine, the front window frame 9 is swung out, lifted up and removed from the upstanding flange 7 and the cover 5 is tipped back to the rear so as to expose the magazine in the interior of the device. The motor drive belt 42 is removed and the large pulley wheel 31 is slipped upwardly from its connection with the roller 27. The handle 38 of the cam member 37 is then swung to a horizontal position, thus withdrawing the roller 32 from contact with the roller 27 against the action of compression spring 36. The endless belt 22 is then placed in position between the rollers 27 and 32 and the handle 38 swung to an upright position, thus permitting the spring 36 to urge the roller 32 against the belt and clamp it between the rollers 32 and 27. A portion of the belt is then stretched around the rollers 24, 25 and 26 and passed underneath the tensioning device 72, through the slots formed by the straps 68 and 69 and the remainder or major portion of the belt placed in the magazine. The pulley wheel 31 is then replaced so that the slot 29 in the hub 30 engages the cross pin 28 mounted in the upper end of roller 27. The drive belt 42 is replaced in position around the pulley wheel 31 and the drive pulley 41 mounted on the upper end of the armature shaft of motor 40.

The battery of light bulbs 19 is wired in the same circuit as the drive motor 40 so that current, when turned on, illuminates the light bulbs 19 and at the same time drives the motor 40. Suitable speed may be secured by moving the control arm 56 of the rheostat to different positions.

The members 70 and 71 tend to unfold the belt 22 and feed it in alignment to the slot in the discharge end of the magazine formed by the plates 68 and 69. The compression spring 74 of the tensioning device is then adjusted so as to cause the drag 72 to press with proper tension on the belt as it passes between the member 72 and the vertical wall 67. This tension stretches the belt taut as it passes along the front of the device and the light from the battery of bulbs 19 is diffused by the translucent glass screen 15 so that an even glow of light is projected through the indicia formed by the perforations 23 through the belt 22. By having a plain glass 10 or one with slightly sand blasted surface 11 on the front of the device in place of the usual diffracting glass commonly used, no distortion of the indicia on the belt takes place and a very sharply defined clear cut letter or figure is seen by the observer even though he is standing at considerable angle with respect to the plane of the front of the device.

Circulation for cooling purposes is secured by air passing in through the holes 2 in base 1, thence forwardly between the base 1 and frame 12, then upwardly through the holes 20 and around the lamp 19. Hot air passes out through the space between the edge 21 and screen 15 and then out through the holes 22.1 in casing 5 into the atmosphere. Having the ventilating passages arranged in the manner shown provides a good circulation but prevents light from the bulbs 19 from being projected out through the holes 2 and 22.1 formed in the exterior casing.

Although but one specific embodiment of this invention has been herein shown and described, it will be understood that numerous details of the construction shown may be altered or omitted without departing from the spirit of this invention as defined by the following claims.

I claim:

1. In a device of the class described, a supporting frame, a plurality of rollers journaled in rigid position on said frame, an endless belt supported in edgewise position by said rollers, means for rotating one of said rollers to drive said belt, an idler roller swingably mounted on said frame adjacent said driving roller, yielding means for normally urging said idler roller toward said drive roller to grip said belt therebetween, and manually operable means for retracting said idler roller from frictional contact with said belt, said drive roller having a helical groove in its peripheral surface for aiding its frictional grip on said belt.

2. In a device of the class described, a supporting frame, a magazine on said frame, an endless belt supported on said frame, with the major portion thereof housed in said magazine, means adjacent one end of said magazine for driving said belt and means adjacent the other end of said magazine for maintaining a tension on said belt as it passes from said magazine, said tension means comprising a swingable member pivotally mounted on said frame adjacent said belt, a stationary wall adjacent said swingable member and positioned on the opposite side of said belt, and yielding means for urging said swingable member toward said wall to slidably grip said belt therebetween.

3. In a device of the class described, a supporting frame, a magazine on said frame, an endless belt supported on said frame, with the major portion thereof housed in said magazine, means adjacent one end of said magazine for driving said belt and means adjacent the other end of said magazine for maintaining a tension on said belt as it passes from said magazine, said tension means comprising a swingable member pivotally mounted on said frame adjacent said belt, a stationary wall adjacent said swingable member and positioned on the opposite side of said belt, yielding means for urging said swingable member toward said wall to slidably grip said belt therebetween and means for varying the tension on said yielding means.

4. In a device of the class described, a housing, a magazine in said housing for holding the folds of an endless belt, one end of said magazine having a slot therein for passage of the belt therethrough and means for providing a square edge to the inner face of said slot so as to snugly embrace said belt.

5. In a device of the class described, a housing, a magazine in said housing for holding the folds of an endless belt, one end of said magazine having a slot therein for passage of the belt therethrough and means in said magazine located in advance of said slot for straightening out the folds of such belt prior to its passage to said slot.

6. In a device of the class described, a housing, a magazine in said housing for holding the folds of an endless belt, one end of said magazine having a slot therein for passage of the belt therethrough means for providing a square edge to the inner face of said slot so as to snugly embrace said belt, and means in said magazine located in advance of said slot for straightening out the folds of such belt prior to its passage to said slot.

7. In a device of the class described, a supporting frame, a driving roller journaled on said supporting frame having a helical groove in its peripheral surface, an idler roller journaled on said frame having a helical groove in its peripheral surface winding in the same general direction as the groove of said driving roller, an endless belt supported in edgewise position by said rollers, and means for rotating said driving roller in one direction to move said belt and to rotate said idler roller in an opposite direction for stretching said belt toward the ends of said grooves.

8. In a device of the class described, a frame, a belt movable on said frame, and a pair of parallel rollers journaled on said frame in position to grip respectively opposite sides of said belt, said rollers having helical grooves in their peripheral surfaces winding in the same general direction whereby said rollers are adapted when rotated in opposite directions to stretch said belt toward the ends of said helical grooves.

Signed at Chicago this 17th day of January, 1928.

HARRY B. BARKER.